(12) United States Patent
Xu

(10) Patent No.: US 9,152,216 B1
(45) Date of Patent: Oct. 6, 2015

(54) SMART TOUCHPAD INPUT DEVICE

(75) Inventor: Yaowu Xu, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 599 days.

(21) Appl. No.: 13/463,771

(22) Filed: May 3, 2012

(51) Int. Cl.
- G06F 3/033 (2013.01)
- G06F 1/32 (2006.01)
- G06F 3/039 (2013.01)

(52) U.S. Cl.
CPC ............ G06F 1/3262 (2013.01); G06F 3/0395 (2013.01); *G06F 1/3287* (2013.01)

(58) Field of Classification Search
CPC .............. G06F 3/0219; G06F 3/04883; G06F 3/04895; G06F 3/041; G06F 3/03547; G06F 1/1643; G06F 3/0412; G06F 1/3231; G06F 21/83; G06F 2203/04106; G06F 2203/04104; G06F 3/017; H04M 2250/22
USPC ...................... 345/156–178; 178/18.01–18.11
See application file for complete search history.

(56) References Cited

U.S. PATENT DOCUMENTS

| | | | |
|---|---|---|---|
| 6,574,095 B2 * | 6/2003 | Suzuki | 361/679.08 |
| 6,654,733 B1 * | 11/2003 | Goodman et al. | 706/52 |
| 7,561,146 B1 | 7/2009 | Hotelling | |
| 2002/0180704 A1 * | 12/2002 | Rudd | 345/168 |
| 2003/0107557 A1 | 6/2003 | Liebenow et al. | |
| 2007/0091070 A1 | 4/2007 | Larsen et al. | |
| 2009/0210568 A1 * | 8/2009 | Peterson et al. | 710/15 |
| 2009/0244092 A1 | 10/2009 | Hotelling | |
| 2010/0283736 A1 * | 11/2010 | Akabane et al. | 345/168 |
| 2011/0109557 A1 | 5/2011 | Di Fiore et al. | |
| 2011/0316774 A1 | 12/2011 | Clifton et al. | |

* cited by examiner

*Primary Examiner* — Amare Mengistu
*Assistant Examiner* — Gloryvid Figueroa-Gibson
(74) *Attorney, Agent, or Firm* — McDermott Will & Emery LLP

(57) ABSTRACT

The subject technology discloses a system for filtering out touches on a touch sensitive input device (e.g., touchpad) during a typing-intensive task. A typing task detection module receives key-press events and computes the typing speed in terms of keys per second in combination with a determined amount of typing based on a number of received key-press events. When input speed and amount of continued typing are higher than a threshold, the typing task detection module then determines that the user is performing a typing task. The typing mode and other characteristics of user's typing activity are used to adjust the responsiveness of touchpad. The subject technology further includes a touchpad responsiveness adjustment module. This module receives the determined typing speed and amount of typing from the typing task detection module, and adjusts the input sensitivity (which controls the responsiveness) of the touchpad to filter out accidental finger touches.

20 Claims, 8 Drawing Sheets

SMART TOUCHPAD INPUT DEVICE

BACKGROUND

Touch sensitive components are now prevalent in different types of computing devices. For instance, a touchpad is commonly included as a component of a computing device, such as a laptop or notebook.

SUMMARY

The subject technology provides for adjusting a responsiveness of a touch-sensitive component of a computing device. The subject technology receives a plurality of key-press events. It is then determined if a typing-intensive task is performed based on a number of received key-press events within a predetermined time period and a typing speed derived from the received key-press events. The subject technology adjusts an input sensitivity of the touch-sensitive component according to a time interval based at least on the typing speed if the typing-intensive task is determined to be performed.

Yet another aspect of the subject technology provides a system for adjusting a responsiveness of a touch-sensitive component of a computing device. The system includes a keystroke detection module configured to receive a plurality of key-press events in which the plurality of key-press events are received in a specific portion of an application. The system further includes a typing-task detection module configured to determine if a typing-intensive task is performed based on a number of received key-press events within a predetermined time period and a typing speed derived from the received key-press events. Additionally, the system includes a touch-sensitive component adjustment module configured to adjust an input sensitivity of the touch-sensitive component according to a time interval based at least on the typing speed if the typing-intensive task is determined to be performed wherein the touch-sensitive component of the computing device comprises a touchpad.

The subject technology further provides for receiving a plurality of key-press events. It is then determined if a typing-intensive task is performed based on a number of received key-press events within a predetermined time period and a typing speed derived from the received key-press events. The subject technology adjusts an input sensitivity of a touch-sensitive component according to a time interval based at least on the typing speed if the typing-intensive task is determined to be performed. Further, it is determined if the number of received key-press events is below a threshold value based on the typing speed. The subject technology then adjusts the input sensitivity of the touch-sensitive component to revert to a higher responsiveness if the number of received key-press events is below the threshold value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
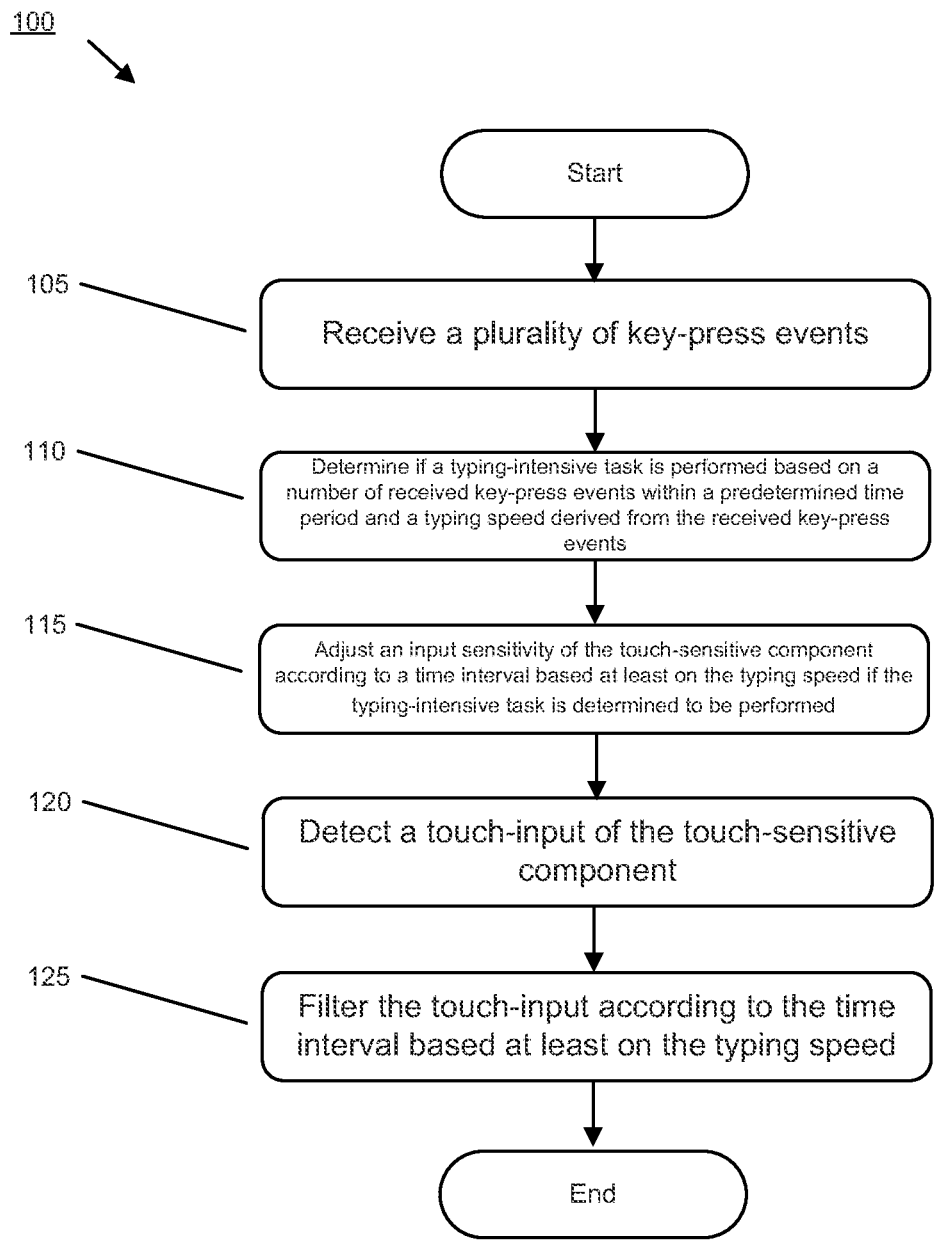
FIG. 1 conceptually illustrates an example process for adjusting a responsiveness of a touch-sensitive component of a computing device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Touch sensitive components (e.g., a touchpad) are now prevalent in different types of computing devices. For instance, a touch sensitive component such as a touchpad is commonly included as a component of a computing device, such as a laptop or netbook. As described herein, the touchpad is an input device featuring a tactile sensor in the form of a two-dimensional surface that can translate input received from the motion and position of a user's fingers and/or hand or portion thereof (e.g., palm) to a relative position on a graphical user interface (GUI) displayed on a display component of the computing device. In one example, the touchpad interprets the user's input to produce cursor movement in the GUI.

In some instances, a user types on a keyboard of the computing device and accidently touches the touchpad whilst in the act of typing. For instance, many laptops or netbooks have a touchpad located near the keyboard. During an act of typing, a user's thumb(s) could inadvertently touch the touchpad and trigger the touchpad. This can result in movement of an input cursor to unintended locations of a graphical user interface.

The subject technology addresses the above issues. For example, the subject technology provides for a system including one or more modules, described in further detail below.

In some configurations, a typing task detection module monitors keyboard activity and determines if a user is in a typing-intensive task. In one example, the typing task detection module receives key-press events and computes the input or typing speed in terms of keys per second in combination with a determined amount of typing based on a number of received key-press events. When input speed and amount of continued typing are higher than a predetermined threshold, the typing task detection module then determines that the user is performing a typing task. This module monitors other characteristics of user typing activity, such as detailed finger moving characteristics in one example. The typing mode and other characteristics of user's typing activity is used to adjust the responsiveness of touchpad in some configurations.

The subject technology further includes a touchpad responsiveness adjustment module. This module receives the determined typing speed and amount of typing from the typing task detection module, and adjusts the input sensitivity (which controls the responsiveness) of the touchpad to filter out accidental finger touches. By way of example, the typing task detection module determines that the user is performing a typing task, and then determines the typing speed effectively equals 50 millisecond/key with a standard deviation of 30 millisecond/key. The touchpad responsiveness adjustment module filters all touchpad input within the following time interval t following any keyboard input: $t=50+30*C$ millisecond.

The responsiveness can be adjusted based on different key inputs. For example, it may be the case that users are prone to accidental touchpad touch following keyboard input of lower row keys, such as Space, Alt, Control, etc. Therefore, the constant C in the above equation can be adjusted for different key input on the keyboard.

Additionally, the subject technology includes a user profile/application profile info analyzing and storage module. In some configurations, this module provides added functionality to further improve touchpad responsiveness and robustness. One use of this module is to record a user's keyboard activity for an extended period of time and analyze detailed statistics information about how a particular user behaves on the keyboard. Information can be recorded include user's speed in typing key combinations, time delays of a user's accidental touches' following different keyboard inputs etc. The information can be further fed into touchpad responsiveness adjustment module to adjust a touchpad's responsiveness for a given user. The information tracking can be further detailed down to application level. For example, the typing characteristics of a user typing in a browser's universal URL bar can be very different from a user's typing in a word processing application. Therefore, the touchpad responsiveness can be further adjusted based on the application where a user's typing is directed.

The system can also be implemented in electronic circuits in which each of the modules is implemented in one or more connected circuits to record keyboard activity and adjust touchpad responsiveness. The system can also be implemented as a combination of driver software and hardware circuits. By way of example, hardware circuits are used to compute typing characteristics such as speed, but driver software tracks user identity and application used. The driver software then interacts with the hardware circuits to adjust touchpad responsiveness.

FIG. 1 conceptually illustrates an example process 100 for adjusting a responsiveness of a touch-sensitive component of a computing device. In one example, the touch-sensitive component of the computing device is a touchpad. The process 100 is performed by one or more computing devices or systems in some configurations.

The process 100 begins at 105 by receiving a plurality of key-press events. For instance, the process 100 monitors key-press events that are received from a keyboard component of the computing device. Key-press events are received in an application such as a web browser running on the computing device typically in a portion of the application (such as a URL bar of the web browser) that accepts keyboard input for keyboard entry of keystrokes e.g., that are then received by the application as the key-press events). In one example, a keyboard device driver running on the computing device interacts with the keyboard component of the computing device by receiving the keyboard entry of keystrokes and then generating key-press events in response to the received keystrokes.

The process 100 at 110 determines if a typing-intensive task is performed based on a number of received key-press events within a predetermined time period and a typing speed derived from the received key-press events. In one example, the typing speed is derived based on respective durations of time between the received key-press events. More specifically, in this example, the typing speed is measured by tracking a number of received key-press events over an aggregation of the respective durations of time between each of the received key-press events. When viewed in combination with the number of received key-press events, an overall shorter duration of time between the received key-press events for the aggregation of the respective durations of time can indicate that a typing-intensive task is detected. Other techniques to measure typing speed can be utilized and still be within the scope of the subject technology.

The process 100 at 115 adjusts an input sensitivity of the touch-sensitive component according to a time interval based at least on the typing speed if the typing-intensive task is determined to be performed. In one example, the time interval is further based on a standard deviation of the typing speed and a constant value. The constant value is based on respective keys corresponding to the key-press events. Further, adjusting the input sensitivity of the touch-sensitive component is further based on an application profile or a user profile in one example. By way of example, the process 100 determines that the typing speed effectively equals 50 millisecond/key with a standard deviation of 30 millisecond/key.

The process 100 at 120 detects a touch-input of the touch-sensitive component. In one example, a device driver for the touch-sensitive component receives touch-input and generates on event(s) for the touch-sensitive component. The process 100 at 125 filters the touch-input according to the time interval t based at least on the typing speed. In one example, the process 100 filters the touch-input within the following time interval following any keyboard input: $t=50+30*C$ millisecond in which C represents the aforementioned constant value. The constant value is defined, in part, based on data representing statistical information of user behavior on a keyboard input device stored in an application profile and/or user profile in one example. The process 100 then ends.

Figure 2:
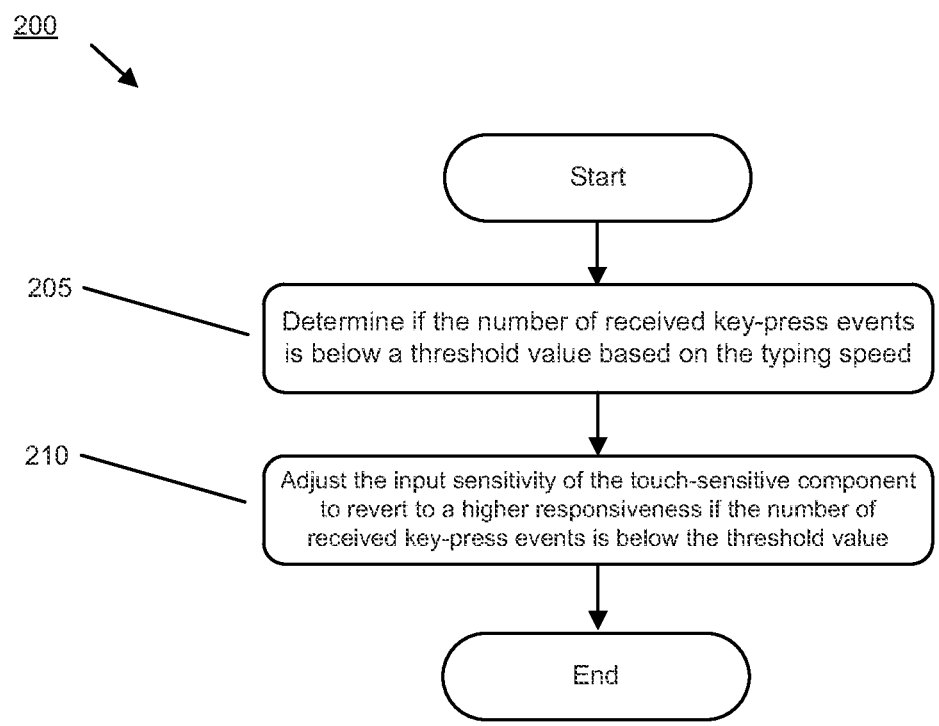
FIG. 2 conceptually illustrates an example process for adjusting the input sensitivity of a touch-sensitive component of a computing device after cessation of a typing-intensive task.

FIG. 2 conceptually illustrates an example process 200 for adjusting the input sensitivity of a touch-sensitive component of a computing device after cessation of a typing-intensive task. The process 200 can be performed by one or more computing devices or systems in some configurations. In some configurations, the process 200 can be performed conjunctively with the process 100 in FIG. 1. By way of example, the process 200 can be performed to revert the responsiveness of the touch-sensitive component to a setting prior to an adjustment based on a detected typing-intensive activity.

The process 200 begins at 205 by determining if the number of received key-press events is below a threshold value based on the typing speed. The process 200 at 210 adjusts the input sensitivity of the touch-sensitive component to revert to a higher responsiveness if the number of received key-press events is below the threshold value. The higher responsiveness, for example, represents a setting for the touch-sensitive component before the typing-intensive activity was detected by the process 100 in FIG. 1. The process 200 then ends.

Figure 3:
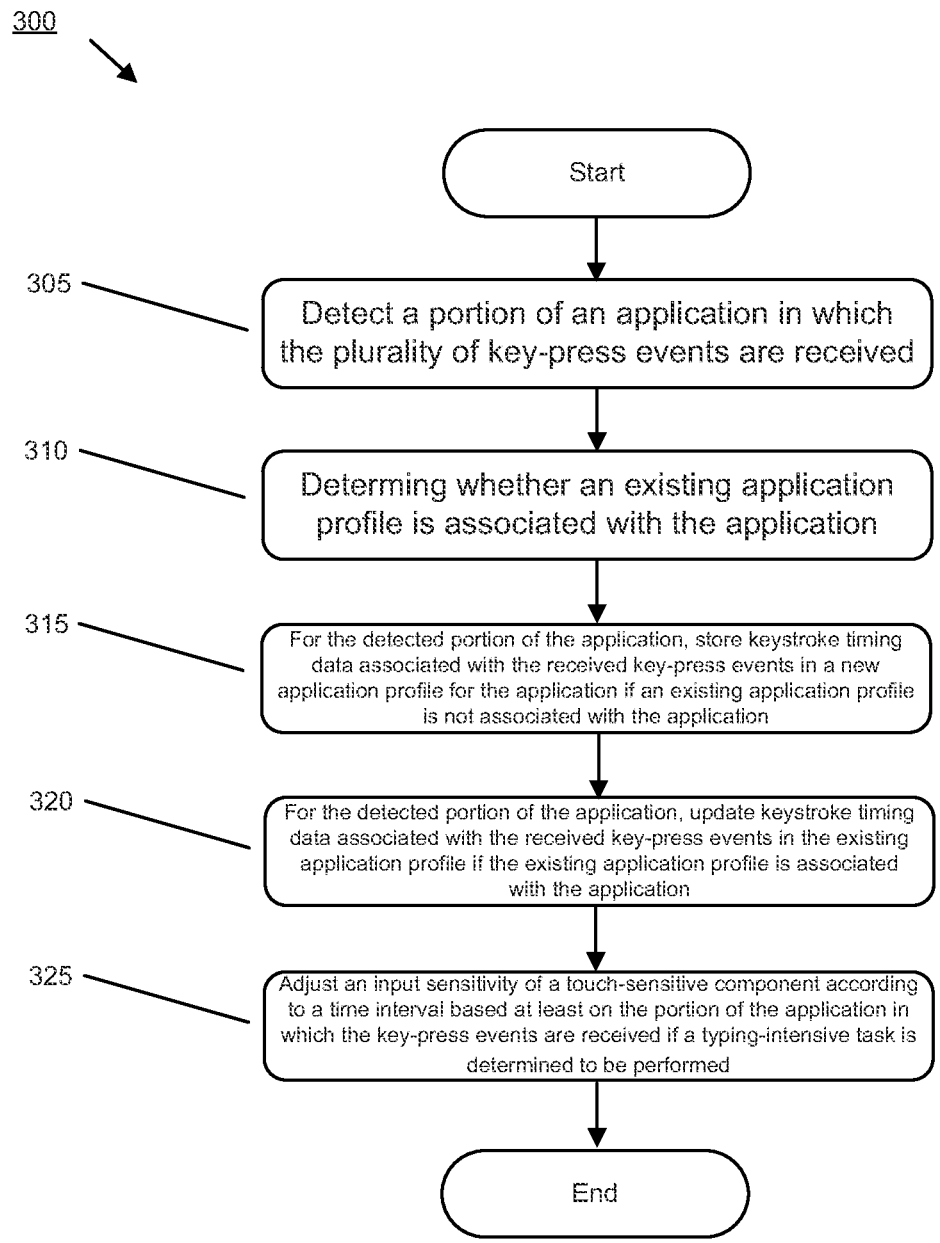
FIG. 3 conceptually illustrates an example process for detecting a portion of an application in which key-press events are received in order to store data corresponding to an application profile.

FIG. 3 conceptually illustrates an example process 300 for detecting a portion of an application in which key-press events are received in order to store data corresponding to an application profile. The application profile, in one example, is utilized to adjust the touch-sensitivity setting for a touch-sensitive component based on data including typing characteristics stored in the application profile. The process 300 can be performed by one or more computing devices or systems in some configurations. In some configurations, the process 300 can be performed conjunctively with the process 100 in FIG. 1. By way of example, the process 300 can be performed after a typing-intensive task is determined to be performed.

The process 300 begins at 305 by detecting a portion of an application in which the plurality of key-press events are received. In one example, the detected portion of the application is a respective keyboard input portion of the application. The process 300 at 310 determines whether an existing application profile is associated with the application. For the detected portion of the application, the process 300 at 315 stores keystroke timing data associated with the received key-press events in a new application profile for the application if an existing application profile is not associated with the application. For the detected portion of the application, the process 300 at 320 updates keystroke timing data associated with the received key-press events in the existing application profile if the existing application profile is associated with the application. Further, the process 300 at 325 adjusts an input sensitivity of a touch-sensitive component (e.g., a touchpad) to a time interval based at least on the portion of the application in which the key-press events are received if a typing-intensive task is determined to be performed. The process 300 then ends.

Figure 4:
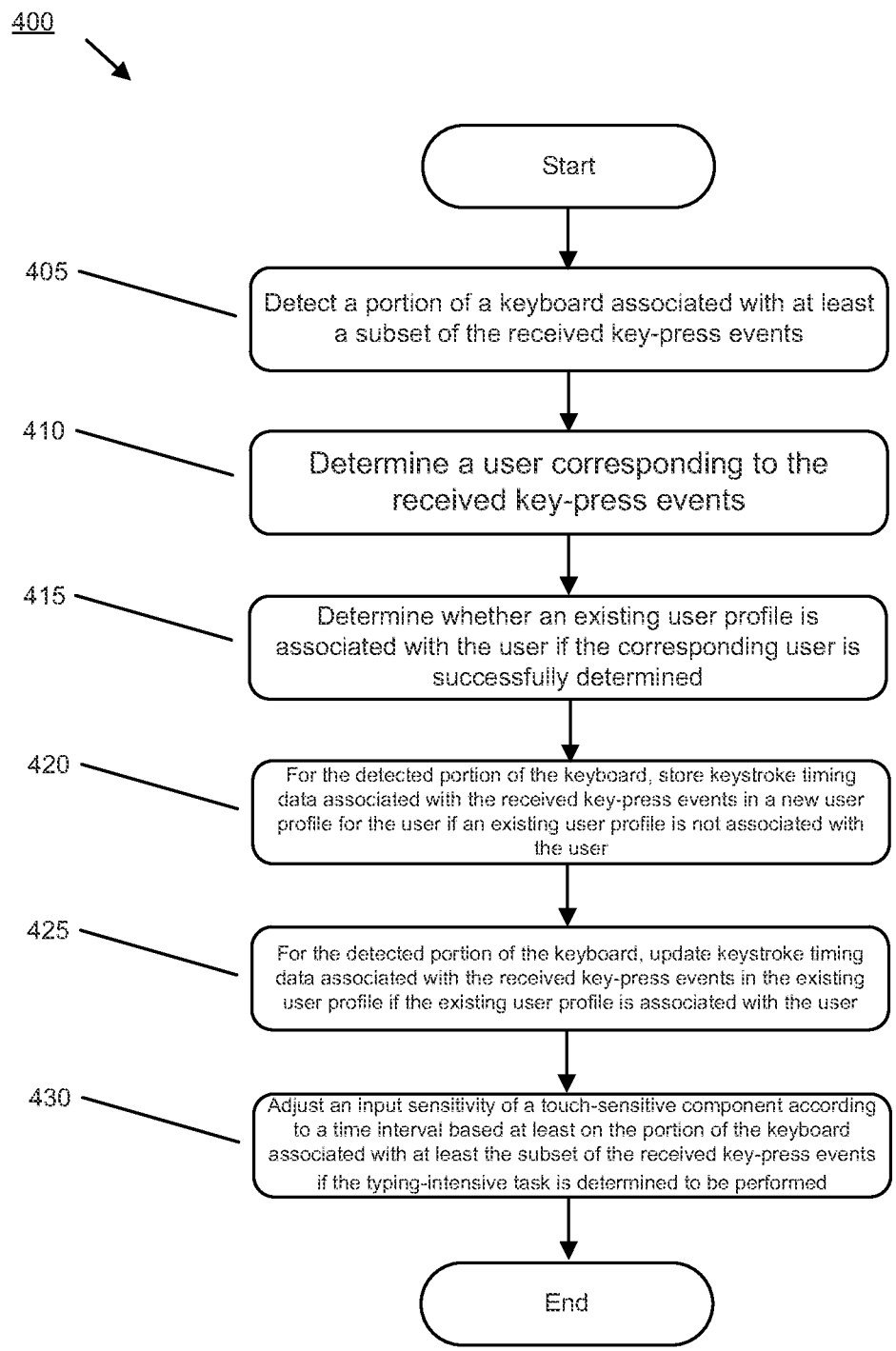
FIG. 4 conceptually illustrates an example process for detecting a portion of a keyboard in which key-press events are received in order to store data corresponding to a user profile.

FIG. 4 conceptually illustrates an example process 400 for detecting a portion of a keyboard in which key-press events are received in order to store data corresponding to a user profile. The user profile, in one example, is utilized to adjust the touch-sensitivity setting for a touch-sensitive component based on data including typing characteristics stored in the user profile. The process 400 can be performed by one or more computing devices or systems in some configurations. In some configurations, the process 400 can be performed conjunctively with the process 100 in FIG. 1. By way of example, the process 400 can be performed after a typing-intensive task is determined to be performed.

The process 400 begins at 405 by detecting a portion of a keyboard associated with at least a subset of the received key-press events. In one example, the portion of the keyboard includes a subset of respective keys located within a particular portion of the keyboard. The process 400 at 410 determines a user corresponding to the received key-press events. Determining the user corresponding to the received key-press events is based on one or more login credentials (e.g., login name, password, etc.) of the user in one example. The process 400 at 415 determines whether an existing user profile is associated with the user if the corresponding user is successfully determined. For the detected portion of the keyboard, the process 400 at 420 stores keystroke timing data associated with the received key-press events in a new user profile for the user if an existing user profile is not associated with the user. For the detected portion of the keyboard, the process 400 at 425 updates keystroke timing data associated with the received key-press events in the existing user profile if the existing user profile is associated with the user. The process 400 then ends.

Figure 5:
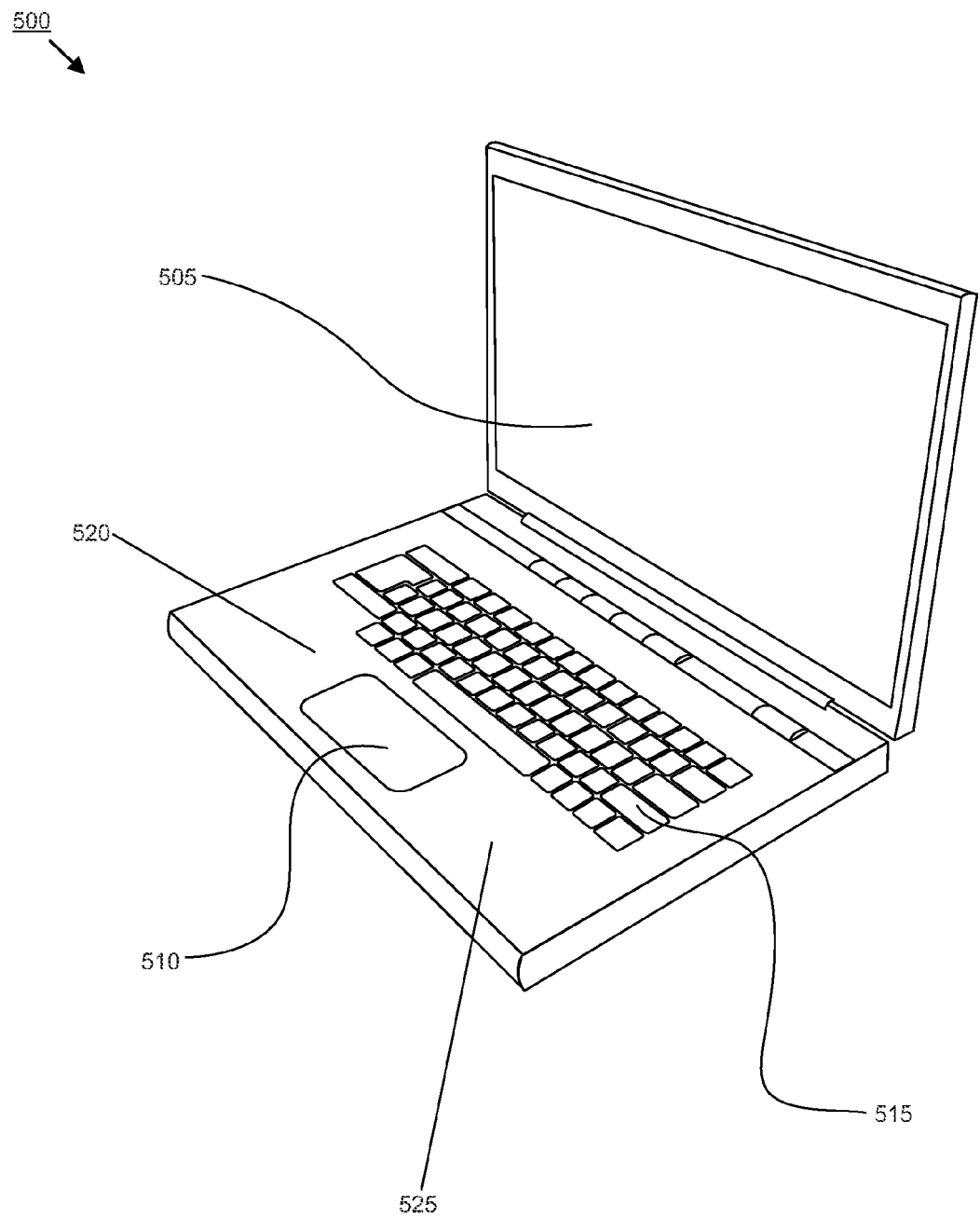
FIG. 5 illustrates an example laptop computing device with a touchpad input device.

FIG. 5 illustrates an example laptop computing device 500 with a touchpad input device. As illustrated, the laptop computing device include a keyboard 515 for inputting keystrokes and a touchpad 510 for receiving touch-input from a user. The laptop computing device further includes palm rest areas 520 and 525 that enable the user to rest the wrist and/or palm of the user's hands while performing a typing activity. A display component 505 (e.g., screen) for displaying a graphical user interface is also included in the laptop computing device 500. Touch input received by the touchpad 510 can control a cursor for interacting with a graphical user interface displayed by the display component 505.

Figure 6:
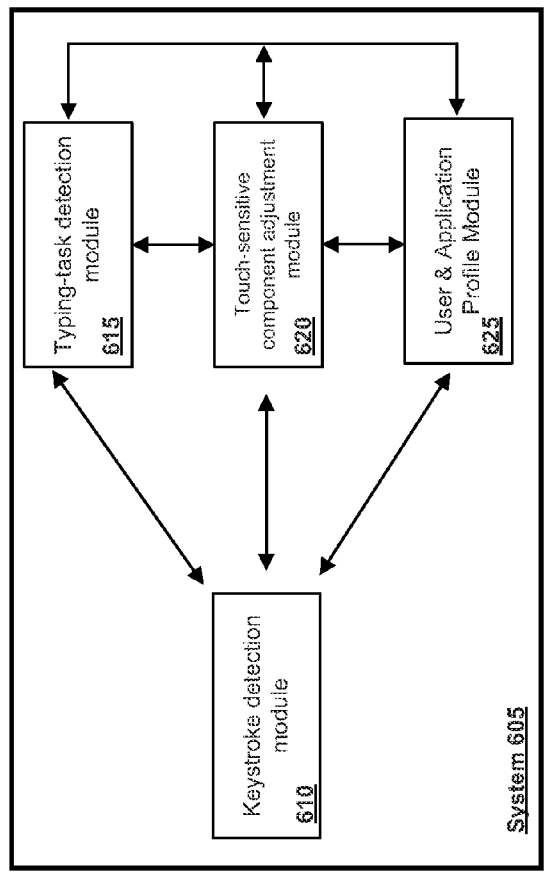
FIG. 6 conceptually illustrates an example computing environment.

FIG. 6 conceptually illustrates an example computing environment 600 including a system. In particular, FIG. 6 shows a system 605 for implementing the above described processes in FIGS. 1-4. In some configurations, the system 605 is part of an implementation running a particular machine (e.g., a laptop, notebook, netbook, etc.).

The system 605 can include memory, one or more processors, and one or more modules stored in memory and configured for execution by the one or more processors. As shown in FIG. 6, the system 605 includes several modules for providing different functionality. The system 605 is configured to include a keystroke detection module 610, a typing-task detection module 615, a touch-sensitive component adjustment module 620 and a user and application profile module 625.

The keystroke detection module 610 is configured to receive key-press events. The typing-task detection module 615 is configured to determine if a typing-intensive task is performed based on a number of received key-press events within a predetermined time period and a typing speed derived from the received key-press events. The touch-sensitive component adjustment module 620 is configured to adjust an input sensitivity of the touch-sensitive component according to a time interval based at least on the typing speed if the typing-intensive task is determined to be performed.

Further, the user and application profile module 625 is configured to detect a portion f an application in which the plurality of key-press events are received, determine whether an existing application profile is associated with the application, for the detected portion of the application, store keystroke timing data associated with the received key-press events in a new application profile for the application if an existing application profile is not associated with the application, for the detected portion of the application, update keystroke timing data associated with the received key-press events in the existing application profile if the existing application profile is associated with the application. The user and application profile module is further configured to detect a portion of a keyboard associated with at least a subset of the received key-press events, determine a user corresponding to the received key-press events, determine whether an existing user profile is associated with the user if the corresponding user is successfully determined. For the detected portion of the keyboard, the user and application profile module 625 is configured to store keystroke timing data associated with the received key-press events in a new user profile for the user if an existing user profile is not associated with the user. Additionally, for the detected portion of the keyboard, the user and application profile module 625 is configured to update keystroke timing data associated with the received key-press events in the existing user profile if the existing user profile is associated with the user.

As further shown in FIG. 6, each of the aforementioned modules can be configured to communicate between each other. For instance, different data, messages, API calls and returns can be passed between the different modules in the system 605.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 7:
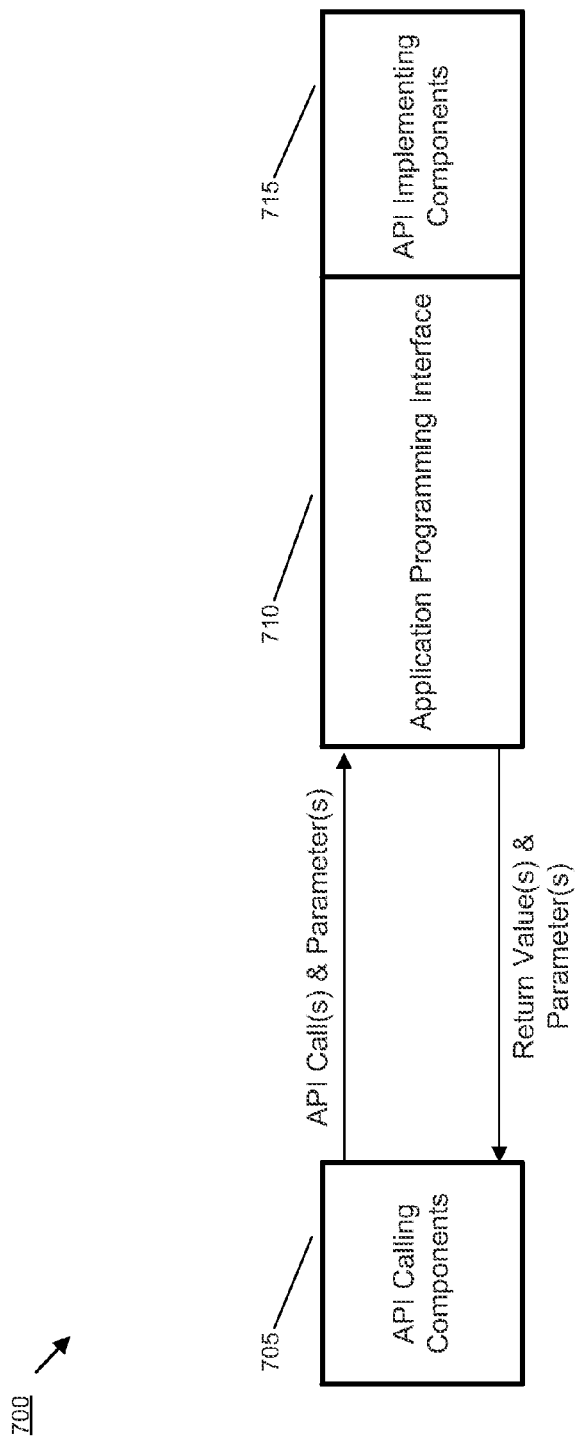
FIG. 7 conceptually illustrates an example application programming interface (API) architecture.

FIG. 7 is a block diagram illustrating an example API architecture, which can be used in some configurations of the subject technology. As shown in FIG. 7, the API architecture 700 includes the API implementing component 715 (e.g., an operating system, a library, a device driver, an API, an application program, software or other module) that implements the API 710. The API 710 specifies one or more functions, methods, classes, objects, protocols, data structures, formats and/or other features of the API-implementing component that can be used by the API-calling component 705. The API 710 can specify at least one calling convention that specifies how a function in the API implementing component receives parameters from the API calling component and how the function returns a result to the API calling component. The API calling component 705 (e.g., an operating system, a library, a device driver, an API, an application program, software or other module), makes API calls through the API 710 to access and use the features of the API implementing component 715 that are specified by the API 710. The API implementing component 715 can return a value through the API 710 to the API calling component 705 in response to an API call.

It will be appreciated that the API implementing component 715 can include additional functions, methods, classes, data structures, and/or other features that are not specified through the API 710 and are not available to the API calling component 705. It should be understood that the API calling component 705 can be on the same system as the API implementing component 715 or can be located remotely and accesses the API implementing component 715 using the API 710 over a network. While FIG. 7 illustrates a single API calling component 705 interacting with the API 710, it should be understood that other API calling components, which can be written in different languages (or the same language) than the API calling component 705, can use the API 710.

The API implementing component 715, the API 710, and the API calling component 705 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 8:
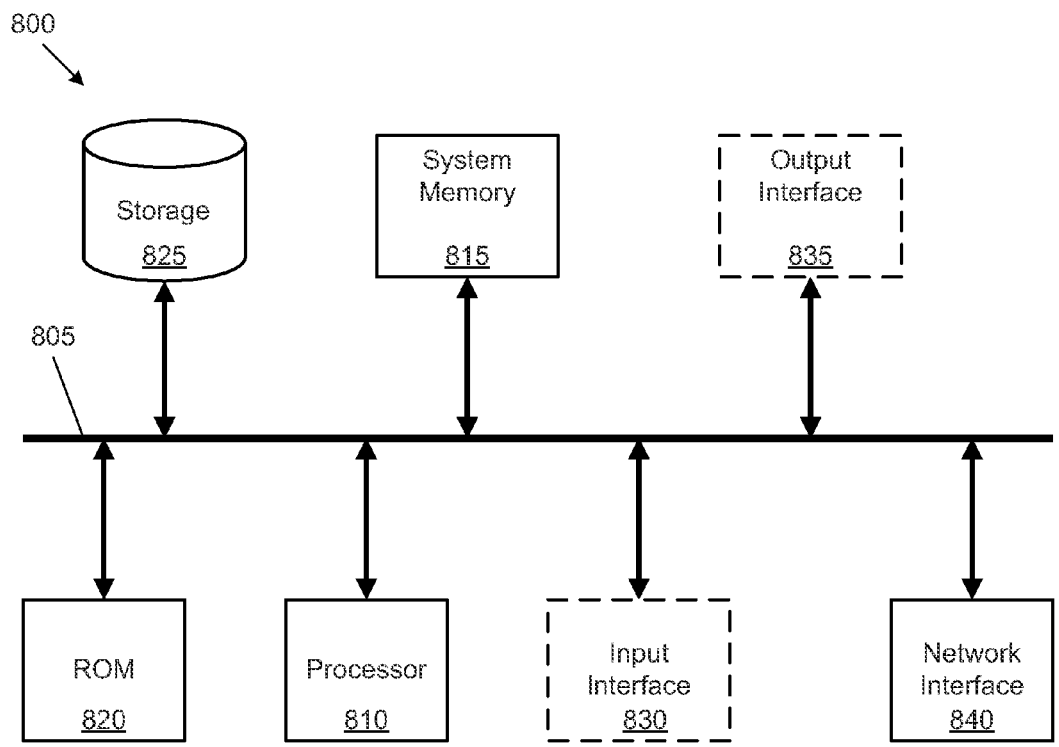
FIG. 8 conceptually illustrates a system with which some implementations of the subject technology may be implemented.

FIG. 8 conceptually illustrates a system 800 with which some implementations of the subject technology can be implemented. The system 800 can be a computer, phone, PDA, or any other sort of electronic device. In some configurations, the system 800 includes a television with one or more processors embedded therein. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the subject technology use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the subject technology's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. Any or all components of system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes aback end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for adjusting a responsiveness of a touch-sensitive component of a computing device, the method comprising:
   receiving a plurality of key-press events;
   determining if a typing-intensive task is performed based on a number of received key-press events within a predetermined time period and a typing speed derived from the received key-press events; and
   adjusting an input sensitivity of the touch-sensitive component for a time interval based on a keypress interval derived from the typing speed and a standard deviation of the typing speed when the typing-intensive task is determined to be performed.

2. The method of claim 1, further comprising:
   detecting a touch-input of the touch-sensitive component; and
   filtering the touch-input according to the time interval based at least on the typing speed.

3. The method of claim 1, wherein the time interval is further based on adjusting the standard deviation of the typing speed by a constant value.

4. The method of claim 3, wherein the constant value is based on respective keys corresponding to the key-press events.

5. The method of claim 1, further comprising:
   determining if the number of received key-press events is below a threshold value based on the typing speed; and
   adjusting the input sensitivity of the touch-sensitive component to revert to a higher responsiveness when the number of received key-press events is below the threshold value.

6. The method of claim 1, wherein the typing speed is derived based on respective durations of time between the received key-press events.

7. The method of claim 1, wherein the touch-sensitive component of the computing device comprises a touchpad.

8. The method of claim 1, wherein the plurality of key-press events are received in a specific portion of an application.

9. The method of claim 8, wherein the application is a web browser.

10. The method of claim 9, wherein the specific portion is a URL bar of the web browser.

11. The method of claim 1, wherein adjusting the input sensitivity of the touch-sensitive component is further based on an application profile or a user profile.

12. The method of claim 1, further comprising:
   detecting a portion of an application in which the plurality of key-press events are received;
   determining whether an existing application profile is associated with the application;
   for the detected portion of the application, storing keystroke timing data associated with the received key-press events in a new application profile for the application if an existing application profile is not associated with the application; and
   for the detected portion of the application, updating keystroke timing data associated with the received key-press events in the existing application profile if the existing application profile is associated with the application.

13. The method of claim 12, wherein the detected portion of the application comprises a respective keyboard input portion of the application.

14. The method of claim 1, further comprising:
   detecting a portion of a keyboard associated with at least a subset of the received key-press events;
   determining a user corresponding to the received key-press events;
   determining whether an existing user profile is associated with the user if the corresponding user is successfully determined;
   for the detected portion of the keyboard, storing keystroke timing data associated with the received key-press events in a new user profile for the user if an existing user profile is not associated with the user; and for the detected portion of the keyboard, updating keystroke timing data associated with the received key-press events in the existing user profile if the existing user profile is associated with the user.

15. The method of claim 14, wherein the portion of the keyboard comprises a subset of respective keys located within a particular portion of the keyboard.

16. The method of claim 14, wherein determining the user corresponding to the received key-press events is based on one or more login credentials of the user.

17. A system for adjusting a responsiveness of a touch-sensitive component of a computing device:
- memory;
- one or more processors;
- one or more modules stored in memory and configured for execution by the one or more processors, the modules comprising:
    - a keystroke detection module configured to receive a plurality of key-press events, wherein the plurality of key-press events are received in a specific portion of an application;
    - a typing-task detection module configured to determine if a typing-intensive task is performed based on a number of received key-press events within a predetermined time period and a typing speed derived from the received key-press events; and
    - a touch-sensitive component adjustment module configured to adjust an input sensitivity of the touch-sensitive component for a time interval based on a keypress interval derived from the typing speed and a standard deviation of the typing speed adjusted by a constant value when the typing-intensive task is determined to be performed, wherein the touch-sensitive component of the computing device comprises a touchpad.

18. The system of claim 17, further comprising:
a user and application profile module configured to detect a portion of an application in which the plurality of key-press events are received, determine whether an existing application profile is associated with the application, for the detected portion of the application, store keystroke timing data associated with the received key-press events in a new application profile for the application if an existing application profile is not associated with the application, for the detected portion of the application, update keystroke timing data associated with the received key-press events in the existing application profile if the existing application profile is associated with the application.

19. The system of claim 18, wherein the user and application profile module is further configured to:
- detect a portion of a keyboard associated with at least a subset of the received key-press events;
- determine a user corresponding to the received key-press events;
- determine whether an existing user profile is associated with the user if the corresponding user is successfully determined;
- for the detected portion of the keyboard, store keystroke timing data associated with the received key-press events in a new user profile for the user if an existing user profile is not associated with the user; and
- for the detected portion of the keyboard, update keystroke timing data associated with the received key-press events in the existing user profile if the existing user profile is associated with the user.

20. A non-transitory machine-readable medium comprising instructions stored therein, which when executed by a machine, cause the machine to perform operations comprising:
- receiving a plurality of key-press events;
- determining if a typing-intensive task is performed based on a number of received key-press events within a predetermined time period and a typing speed derived from the received key-press events; and
- adjusting an input sensitivity of a touch-sensitive component for a time interval based on a calculation including adding a keypress interval derived from the typing speed to a standard deviation of the typing speed adjusted by a constant value when the typing-intensive task is determined to be performed;
- determining if the number of received key-press events is below a threshold value based on the typing speed; and
- adjusting the input sensitivity of the touch-sensitive component to revert to a higher responsiveness when the number of received key-press events is below the threshold value.

* * * * *